April 1, 1969 R. R. ECKENBRECHT 3,436,485

FREQUENCY DOUBLER, STEREO INDICATOR CIRCUITRY FOR FM RADIO RECEIVERS

Filed Sept. 20, 1966

INVENTOR.
ROBERT R. ECKENBRECHT
BY Robert E. Strauss
ATTORNEY

United States Patent Office 3,436,485

Patented Apr. 1, 1969

3,436,485

FREQUENCY DOUBLER, STEREO INDICATOR CIRCUITRY FOR FM RADIO RECEIVERS

Robert R. Eckenbrecht, Batavia, N.Y., assignor to Sylvania Electric Products Inc., a corporation of Delaware Filed Sept. 20, 1966, Ser. No. 580,719
Int. Cl. H04j *1/00;* H04b *1/16*
U.S. Cl. 179—15 7 Claims

ABSTRACT OF THE DISCLOSURE

A series circuit arrangement including a parallel resonant tank circuit connected between the output of a frequency multiplier amplifier and the input of a switching amplifier. The frequency multiplier amplifier is operated class B or class C so that the output is rich in second harmonics of the input signal for which the parallel resonant tank circuit is tuned. The amplified input signal passes through the tank circuit and operates to control the switching amplifier.

This invention relates generally to stereophonic FM radio receivers, and more particularly to improved circuitry for providing the synchronization signal necessary for the demodulation of a stereophonic signal, having the additional capability of providing an indication that a stereophonic signal is being received.

According to the standards established by the Federal Communications Commission for FM stereo broadcasting, a composite stereo signal transmitted by a station consists of a first signal which is the audio sum of a left channel signal plus a right channel signal, $(L+R)$, a second signal which is the audio difference of the left and right channel signal, $(L-R)$, and a continuous wave pilot signal. The $(L-R)$ signal frequency modulates the FM carrier in a 0–15 kc. sideband of a 38 kc. subcarrier. The 38 kc. subcarrier is suppressed in transmission, making it necessary to reinsert at the receiver a 38 kc. signal of appropriate phase to permit demodulation of the $(L-R)$ signal. This is accomplished through the use of the pilot signal which is transmitted as a 19 kc. signal and doubled at the receiver to provide a synchronized 38 kc. signal for subcarrier reinsertion.

The above standards were selected to provide a compatible monaural-stereophonic FM broadcasting system. A monaural FM receiver is able to process the $(L+R)$ signal of a stereophonic broadcast to provide a monaural reception of the broadcast, and a stereophonic receiver is able to process a monaural signal through the $(L+R)$ channel of the receiver for normal monaural reception.

One of the problems of compatible monaural-stereophonic FM broadcasting is that encountered by the listener who, in tuning in a station, wishes to determine whether a monaural or a stereophonic signal is being received. Such a determination is especially difficult when there is only a small difference between the left and right channel outputs of the stereo receiver, as, for example, is often the case when a program of classical music is being received. To overcome this difficulty, the 19 kc. pilot signal, which is present during stereo broadcasting, but is not present in the monaural transmission, is often utilized to provide an indication that a stereophonic transmission is being received.

Prior art systems generally divide the 19 kc. pilot signal and apply a part of it to operate a switching circuit which, when activated, supplies power to an indicating device, such as a lamp, to thereby provide an indication of the presence of a stereophonic signal. However, in such circuits it is not uncommon to encounter a false stereo indication signal which is caused by noise activating the switching circuit as the receiver is tuned across the FM band. Also, the additional circuitry required to provide the visual indication necessarily affects the cost of the receiver.

Accordingly it is an object of this invention to provide a reliable, economical circuit for generating a signal for subcarrier reinsertion and further capable of providing means for indicating the presence of an FM stereophonic transmission.

Another object of this invention is to provide circuitry capable of providing an indication of the presence of an FM stereophonic signal which is unaffected by short duration noise signals.

These and other objects are achieved in one aspect of the invention by a series circuit arrangement wherein the pilot signal is first operative to generate a signal suitable to provide subcarrier reinsertion with the portion of the pilot signal thereafter remaining utilized to provide an indication of the presence of the FM stereophonic signal. The invention utilizes a direct current signal derived, using a simple capacitive filter, from the 19 kc. pilot signal to control the indicator portion of the circuit, thereby resulting in an indicator circuit which is relatively immune to short duration noise signals since the capacitive filter acts as a by-pass for such signals.

For a better understanding of the present invention, together with other and further objects, advantages, and capabilities thereof, reference is made to the following disclosure and appended claims in connection with the accompanying drawings, in which:

Figure 2:
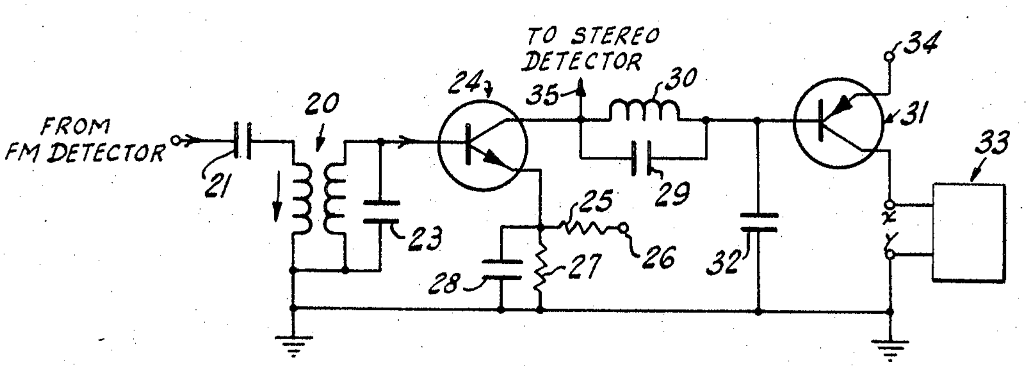
FIG. 2 is a schematic circuit diagram of the combined frequency doubler and stereo indicator circuit of FIG. 1.
Figures 2A, 2B, 3:
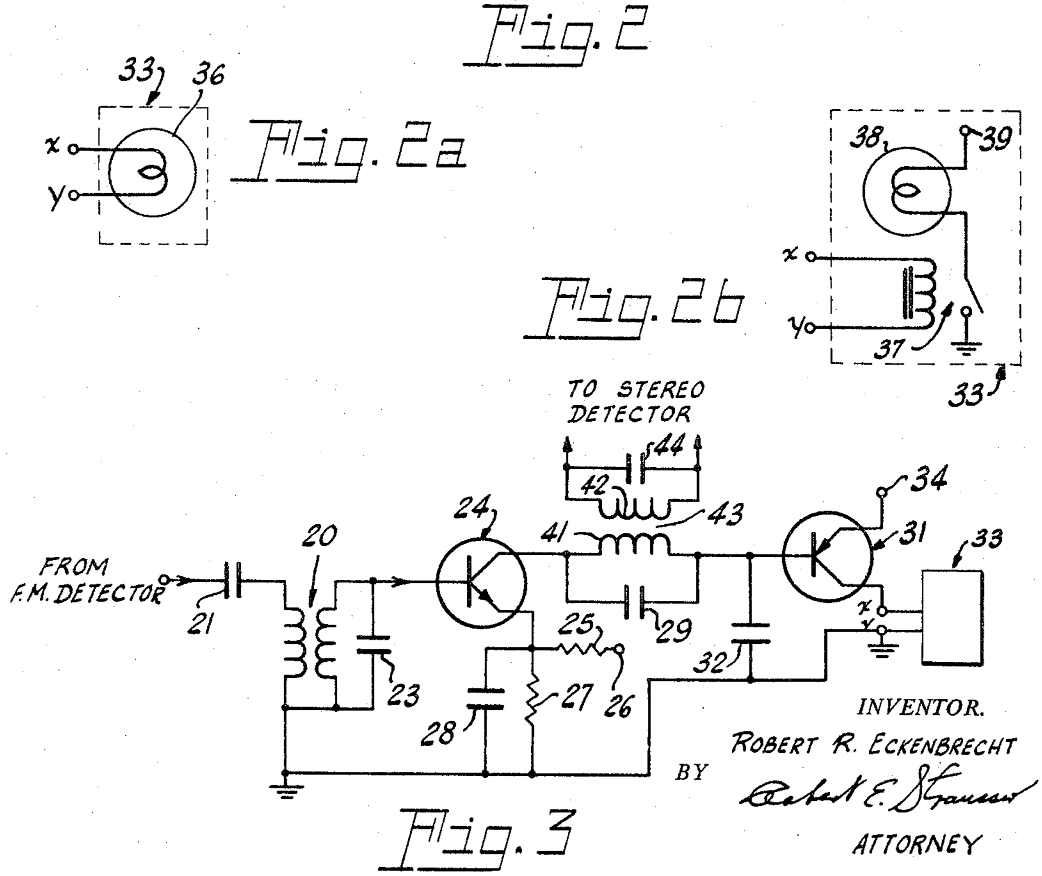

FIGS. 2*a* and 2*b* are schematic circuit diagrams of typical visual indicating devices adapted for use in the circuit of FIG. 2; and FIG. 3 is a schematic circuit diagram of an alternate embodiment of the frequency doubler and stereo indicator circuit of FIG. 2.

Figure 1:
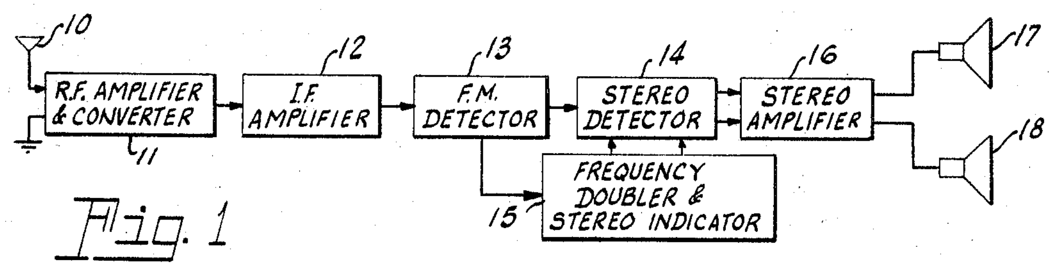
FIG. 1 is a block diagram of an FM stereophonic receiver incorporating the invention.

Referring now to the drawings, the block diagram of FIG. 1 illustrates a typical FM stereophonic radio receiver. An antenna 10 couples the received signal to an RF amplifier and converter 11, where the received signal carrier is heterodyned to produce an intermediate frequency signal. The intermediate frequency signal is amplified by an IF amplifier 12 and fed to the FM detector 13. In response to a stereophonic FM signal, the pilot signal is coupled to the frequency doubler and stereo indicator circuit 15. A 38 kc. signal output from the circuit 15, representing the original suppressed subcarrier, is applied to a stereo detector 14 where the 38 kc. signal is combined with the audio $(L+R)$ signal and the sidebands of the $(L-R)$ signal which the stereo detector 14 receives from the FM detector 13. The stereo detector 14 develops pure L and R audio signals which are suitably amplified by a stereo amplifier 16 and applied, respectively, to speaker systems 17 and 18 to thereby provide the desired stereo output signals for listening pleasure.

The circuit of FIG. 2 has input circuitry consisting of a transformer 20 having its primary winding connected via a capacitor 21 to an input from the FM detector 13. A parallel tuned circuit consisting of the secondary winding of the transformer 10 and a capacitor 23 is connected between the base electrode of an NPN transistor 24 and a point of reference potential. The emitter electrode of the transistor 24 is connected via a resistor 25 to a source of positive electrical potential as represented by the terminal 26, and is further connected by means of a parallel RC network consisting of a resistor 27 and a capacitor 28 to the aforementioned point of reference potential. A tuned tank consisting of a capacitor 29 in parallel with an inductor 30 is connected between the collector electrode of the transistor 24 and the base electrode of a PNP transistor 31. An output terminal 35 is connected directly to the collector electrode of transistor 24. A capacitor 32 is connected between the base electrode of the transistor 31 and the point of reference potential, and the emitter electrode of the transistor 31 is connected directly to a source of positive electrical potential as represented by the terminal 34.

A visual indicating device 33 is connected between the collector electrode of the transistor 31 and the point of reference potential. As illustrated in FIG. 2*a*, the indicating device 33 may consist solely of a lamp 36 connected between the X and Y terminals or, as shown in FIG. 2*b*, the indicating device 33 may consist of a relay 37 having its control winding connected between the X and Y terminals. One contact of the relay 37 is connected directly to a point of reference potential and a lamp 38 is connected between the other relay contact and a suitable source of energizing potential as represented by the terminal 39.

In operation, the circuit of FIG. 2 receives the output signal from the FM detector of the stereophonic receiver. The transformer 20 is tuned to 19 kc., thereby applying the 19 kc. pilot signal to the base of the transistor 24. The resistors 25 and 27 are operative to bias the transistor 24 for class B operation, such that, absent a pilot signal, the transistor is biased beyond cut-off for noise immunity. Since the transistor 24 is driven class B, the output at the collector is rich in second harmonics, and a 38 kc. signal developed across the tuned circuit consisting of inductor 30 and capacitor 29 is available at output terminal 35. This 38 kc. signal is utilized to synchronize the receiver 38 kc. oscillator (not shown) for purposes of carrier reinsertion.

Power is supplied to transistor 24 from the source of positive potential 34 via the emitter-base junction of the transistor 31. Absent a 19 kc. pilot signal, transistor 31 is nonconducting. However, when a 19 kc. pilot signal is present, the positive half cycles at the collector of the transistor 24 are passed through the tuned circuit consisting of inductor 30 and capacitor 29 and develop a positive voltage across the capacitor 32 to thereby drive transistor 31 into conduction. Thus, the presence or absence of the 19 kc. pilot signal may be determined by monitoring the current through the transistor 31, such as by inserting an indicating device 33 in the collector circuit of transistor 31. Since the capacitor 32 is effectively a filter capacitor, it will by-pass high frequency, short duration noise pulses to ground, thus preventing such pulses from initiating conduction of the transistor 31. This eliminates possible false stereo indications due to such signals.

When utilizing the circuit of FIG. 2, it is to be understood that the stereo detector circuitry 14 of FIG. 1 contains a 38 kc. oscillator circuit (not shown) which operates under the synchronous control of the 38 kc. signal derived from the collector electrode of transistor 24. However, in some instances it may be desirable to obtain the reproduced 38 kc. signal subcarrier directly from the 19 kc. pilot signal, thereby eliminating the need for a separate 38 kc. oscillator circuit. The present invention provides such a capability as shown in FIG. 3, a modified version of the circuit of FIG. 2. The primary difference in the circuit of FIG. 3 is that the inductor connected between collector of transistor 24 and the base of transistor 31 is the primary winding 41 of a transformer 43. A capacitor 44 is connected in parallel with the secondary winding 42 of the transformer 43, forming a parallel tuned circuit the output of which is coupled to the stereo detector circuitry 14.

The stereo indicator function of the circuit of FIG. 3 is similar to the operation of the circuit of FIG. 2. However, to generate the 38 kc. signal, the circuit consisting of the capacitor 29 in parallel with the primary winding 41 of the transformer 43 is sharply tuned to 38 kc. The circuit consisting of the capacitor 44 in parallel with the secondary winding 42 is also tuned to 38 kc., but may have a broader bandpass. The 38 kc. second harmonics of the 19 kc. pilot signal are then developed across the winding 41 and capacitor 29 and are transformer coupled to the secondary winding 42 and applied to the stereo detector circuitry 14. It has been found that the signal present at the collector electrode of the transistor 24 is richer in second harmonics if the transistor 24 is operated class C rather than class B. This may be easily accomplished by altering the values of the biasing resistors 25 and 27.

Thus, there has been provided an improved frequency multiplier and stereo indicator circuit having many advantages over the prior art. By utilizing the pilot signal in a series mode, the circuitry required to provide the desired functions has been simplified, resulting in a more reliable and economical circuit. Also, the filtering action inherent in the circuit provides an improved noise immunity, thereby eliminating erroneous signal indications which might otherwise be caused by short duration noise signals.

While the circuits as described above represent preferred embodiments of the present invention, it is apparent that numerous modifications may be made, depending upon particular system requirements. For example, if the sources of positive energizing potential are replaced by suitable sources of negative energizing potential, the NPN and PNP transistors may be replaced by PNP and NPN transistors, respectively. Also, it is obvious that the indicator drive transistor 31 of FIG. 2 or FIG. 3 may be replaced by other available semiconductor devices responsive to the derived signal levels, and it is to be understood that any suitably sensitive device may be utilized as an indicating device. It will be obvious to those skilled in the art that various other changes and modifications may be made without departing from the scope of the invention as defined by the appended claims.

What is claimed is:

1. In stereophonic frequency modulation receivers including an FM detector circuit and a stereo detector circuit, wherein signals of a predetermined pilot frequency are present in the output of the FM detector during the reception of a stereophonic broadcast which must be multiplied in frequency and applied to the stereo detector circuit to permit demodulation of stereophonic signal components, a circuit operative to perform such frequency multiplication and further operative to provide an indication of the presence of signals at the pilot frequency, said circuit comprising:

input circuitry adapted to receive signals at the pilot frequency and operative to provide output signals at the pilot frequency and at least one multiple of the pilot frequency;

indicator circuitry operative in response to signals at the pilot frequency to provide an indication of the presence of said signals;

a tank circuit tuned to a multiple of said pilot frequency connected in series between said input circuitry and said indicator circuitry, said tank circuit operative to couple signals at said pilot frequency from said input circutry to said indicator circuitry; and means coupling signals from said tank circuit to the stereo detector circuitry.

2. The invention according to claim 1, wherein said input circuitry comprises:

a transistor having base, emitter and collector electrodes;

a source of biasing potential;

first and second resistors connecting the emitter electrode of said transistor to said source of biasing potential and to a point of reference potential, respectively;

an input terminal adapted to receive signals from the FM detector circuit; and means connecting said input terminal to the base electrode of said transistor.

3. The invention according to claim 1 wherein said tank circuit comprises an inductor and a capacitor connected in parallel with said inductor.

4. The invention according to claim 1 including a transformer having primary and secondary windings, wherein said tank circuit comprises the primary winding of said transformer and a capacitor connected in parallel with the primary winding of said transformer, and wherein said means coupling signals from said tank circuit to the stereo detector circuit comprises means connecting the secondary winding of said transformer to said stereo detector circuit.

5. The invention according to claim 1, wherein said indicator circuitry comprises:

a transistor having base, emitter and collector electrodes;

a source of energizing potential connected to the emitter electrode of said transistor;

an indicating device connected between the collector electrode of said transistor and a point of reference potential; and a capacitor connected between the base electrode of said transistor and the aforementioned point of reference potential.

6. The invention according to claim 5, wherein said indicating device comprises a lamp.

7. The invention according to claim 5 wherein said indicating device comprises:

a relay having a control coil and a pair of relay contacts;

means connecting said control coil between the collector electrode of said transistor and the point of reference potential;

a source of electrical potential;

a lamp connected between said source of energizing potential and one of said relay contacts; and means connecting said other relay contact to a point of reference potential, whereby current flowing through said control coil is operative to close said relay contacts, thereby causing current to flow from said source of electrical potential through said lamp.

References Cited

UNITED STATES PATENTS

| | | | |
|---|---|---|---|
| 3,319,004 | 5/1967 | Avins | 179—15 |
| 3,306,980 | 2/1967 | Kakamura et al. | 179—15 |
| 3,294,912 | 12/1966 | Merritt | 179—15 |
| 3,290,443 | 12/1966 | Mergner et al. | 179—15 |
| 3,264,414 | 8/1966 | Santilli et al. | 179—15 |
| 3,234,334 | 2/1966 | Mills | 179—15 |
| 3,219,760 | 11/1965 | Loughlin | 179—15 |
| 3,116,372 | 12/1963 | Wolff | 179—15 |

ROBERT L. GRIFFIN, *Primary Examiner.*

CARL R. VONHELLENS, *Assistant Examiner.*